United States Patent [19]

Robeson

[11] Patent Number: 5,368,919
[45] Date of Patent: Nov. 29, 1994

[54] PROPYLENE POLYMER COMPOSITIONS CONTAINING HIGH MELT STRENGTH PROPYLENE POLYMER MATERIAL

[75] Inventor: Leroy V. Robeson, New Castle County, Del.

[73] Assignee: HIMONT Incorporated, Wilmington, Del.

[21] Appl. No.: 64,616

[22] Filed: May 20, 1993

[51] Int. Cl.$^5$ .................. C08L 23/10; C08L 23/16; D01F 6/46; D02G 3/00

[52] U.S. Cl. .................... 428/224; 525/194; 525/240; 524/528; 522/129; 522/157; 522/161; 428/364

[58] Field of Search ............... 525/240, 194; 428/224, 428/364

[56] References Cited

U.S. PATENT DOCUMENTS

| | | | |
|---|---|---|---|
| 3,415,904 | 12/1968 | Taniguchi et al. | 260/897 |
| 4,282,076 | 8/1981 | Boynton | 525/240 |
| 4,296,022 | 10/1981 | Hudson | 525/240 |
| 4,626,467 | 12/1986 | Hostetter | 428/288 |
| 4,707,524 | 11/1987 | Ehrig et al. | 525/333.8 |
| 4,829,125 | 5/1989 | Yeo et al. | 525/240 |
| 4,872,880 | 10/1989 | Boocock | 8/513 |
| 4,897,452 | 1/1990 | Berrier et al. | 525/333.8 |
| 4,916,198 | 4/1990 | Scheve et al. | 526/351 |
| 5,047,446 | 9/1991 | DeNicola, Jr. | 522/157 |
| 5,047,485 | 9/1991 | DeNicola | 525/387 |
| 5,116,881 | 5/1992 | Park et al. | 521/143 |

OTHER PUBLICATIONS

Kresser—"Polypropylene" May 1961, pp. 226–231 Reinhold Plastics Application Series.
Farber—"Latest Developments in Polypropylene—" Jul. 1966 American Dyestuff Reporter—pp. 26, 27, 30 & 31.
The teachings of Y. Lin, et al., "The Effect of Pigments on the Development of Structure and Properties of Polypropylene Filaments" pp. 1950–1953.

Primary Examiner—Carman J. Seccuro, Jr.

[57] ABSTRACT

Disclosed is a propylene polymer composition consisting essentially of (A) a propylene polymer resin and (B) from 0.05 to 0.2 parts of a normally solid, high molecular weight, gel-free, propylene polymer material having (1) a branching index of less than 1 and significant strain hardening elongational viscosity, or (2) at least (a) either z-average molecular weight $M_z$ of at least $1.0 \times 10^6$ or a ratio of the z-average molecular weight $M_z$ to weight average molecular weight $M_w$, $M_z/M_w$, of at least 3.0 and (b) either equilibrium compliance $J_{eo}$ of at least $12 \times 10^{-5}$ cm$^2$/dyne or recoverable shear strain per unit stress $Sr/S$ of at least $5 \times 10^{-5}$ cm$^2$/dyne at 1 sec$^{-1}$.

18 Claims, No Drawings

PROPYLENE POLYMER COMPOSITIONS CONTAINING HIGH MELT STRENGTH PROPYLENE POLYMER MATERIAL

FIELD OF THE INVENTION

This invention relates to a polyolefin composition, and more specifically, to a propylene polymer composition having incorporated therein a high melt strength propylene polymer material.

BACKGROUND OF THE INVENTION

Polypropylene resins have been widely used in various fields, such as fibers, films and other shaped articles, because of their excellent physical and mechanical properties. However, polypropylene has high crystallinity and poor affinity for dye or pigments.

Attempts have been made to improve the dye receptivity of polypropylene resin. For example, U.S. Pat. No. 3,415,904 discloses incorporating into polypropylene an ethylene/acrylic ester copolymer which has been treated with an amine. U.S. Pat. No. 4,872,880 discloses treating a polyolefin article with an aqueous dye bath, wherein the polyolefin is a blend of a polyolefin and a copolymer selected from (a) a zinc ionomer of a copolymer of an alpha-olefin and (b) a graft copolymer of at least one alpha, beta-unsaturated carboxylic acid or unsaturated carboxylic acid anhydride grafted onto a polyolefin backbone.

It is known and discussed in the paper of Y. Lin, et. al., entitled, "The Effect of Pigments on the Development of Structure and Properties of Polypropylene Filaments", ANTEC '91, page 1950–1953, that many compounds act as nucleating agents for the crystallization of polypropylene and different pigments nucleate crystallization in polypropylene during the fiber forming process, blue pigments being highly active as a nucleating agent and white pigments being substantially less active.

Thus, in view of the varying degree of nucleating activity of different pigments, when processing fibers/yarns of propylene polymer resins having color, adjustments typically must be made in processing conditions, spinning speeds and draw ratios, in order to produce colored fibers/yarns with consistent and desirable properties depending upon the particular color used. These changes in processing conditions generally result in lost production time as well as production of yarns that do not meet target specifications.

SUMMARY OF THE INVENTION

Unexpectedly, it has been found that by incorporating from 0.05% to 0.2% of a normally solid, high molecular weight, gel-free, propylene polymer material (1) having a branching index of less than 1 and significant strain hardening elongational viscosity or (2) at least (a) either z-average molecular weight $M_z$ of at least $1.0 \times 10^6$ or a ratio of the z-average molecular weight $M_z$ to weight average molecular weight $M_w$, $M_z/M_w$, of at least 3.0 and (b) either equilibrium compliance $J_{eo}$ of at least $12 \times 10^{-5}$ cm$^2$/dyne or recoverable shear strain per unit stress Sr/S of at least $5 \times 10^{-5}$ cm$^2$/dyne at 1 sec$^{-1}$, into a propylene polymer resin, a composition is obtained which allows propylene polymer resins over a wide range of colors to be spun at the same process conditions to produce fiber/yarn with consistent and desirable properties, such as elongation, shrinkage and tenacity.

Accordingly, there is provided a propylene polymer composition consisting essentially of (A) a propylene polymer resin and (B) from 0.05 to 0.2%, and preferably from 0.05 to 0.126%, of a normally solid, high molecular weight, gel-free, propylene polymer material having a branching index of less than 1 and significant strain hardening elongational viscosity, optionally predispersed in a propylene polymer resin that is the same or different from (A).

DETAILED DESCRIPTION OF THE INVENTION

All parts and percentages used in this application are by weight unless otherwise specified. Ambient or room temperature is approximately 25° C.

The propylene polymer resin, component (A), used in the composition of the present invention can be (i) a propylene homopolymer having an isotactic index greater than 80, preferably from 85 to 98, or (ii) a random copolymer of propylene and an olefin selected from ethylene or $C_{4-10}$ alpha-olefins, provided that when the olefin is ethylene, the maximum polymerized ethylene content is about 10%, preferably 4–9%, and when the olefin is a $C_{4-10}$ alpha-olefin, the maximum polymerized content thereof is about 20%, preferably 16%.

Preferably, the propylene polymer resin, component (A), is a propylene homopolymer.

Component (B) of the present invention is a normally solid, high molecular weight, gel-free, propylene polymer material which has (1) a branching index of less than 1, preferably less than 0.9, and most preferably from 0.2 to 0.6, and significant strain hardening elongational viscosity or (2) at least (a) either z-average molecular weight $M_z$ of at least $1.0 \times 10^6$ or a ratio of the z-average molecular weight $M_z$ to weight average molecular weight $M_w$, $M_z/M_w$, of at least 3.0 and (b) either equilibrium compliance $J_{eo}$ of at least $12 \times 10^{-5}$ cm$^2$/dyne or recoverable shear strain per unit stress Sr/S of at least $5 \times 10^{-5}$ cm$^2$/dyne at 1 sec$^{-1}$.

Said propylene polymer material is selected from the group consisting of (i) a homopolymer of propylene, (ii) a random copolymer of propylene and an olefin selected from the group consisting of ethylene and $C_{4-10}$ alpha-olefins, provided that, when said olefin is ethylene, the maximum polymerized ethylene content is about 5%, preferably about 4%, and when said olefin is a $C_{4-10}$ alpha-olefin, the maximum polymerized alpha-olefin content is about 20%, preferably about 16%, and (iii) a random terpolymer of propylene and alpha-olefins selected from the group consisting of ethylene and $C_{4-8}$ alpha-olefins, provided that the maximum polymerized $C_{4-8}$ alpha-olefin content is about 20%, preferably 16%, and when ethylene is one of said alpha-olefins, the maximum polymerized ethylene content is about 5%, and preferably about 4%.

Preferably, the propylene polymer material is a propylene homopolymer.

Said $C_{4-10}$ alpha-olefins include linear or branched $C_{4-10}$ alpha-olefins, such as 1-butene, isobutylene, 1-pentene, 3-methyl-1-butene, 1-hexene, 3,4-dimethyl-1-butene, 1-heptene, 3-methyl-1-hexene.

As used herein "high molecular weight" means weight average molecular weight of at least about 100,000. "Branching index" is the degree of long chain branching as defined in U.S. Pat. Nos. 4,916,198, 5,047,445 and 5,047,485.

As used herein "z-average molecular weight, $M_z$", "equilibrium compliance $J_{eo}$" and recoverable shear strain per unit stress, $S_r/S$" are defined in U.S. Pat. No. 5,116,881.

Said propylene polymer material can be prepared by irradiating or peroxide treating a normally solid, high molecular weight, linear, propylene polymer resin in any physical form, for example, spherical, finely divided powder particles, granules, flakes and pellets. The radiation method is typically carried out according to the method described in U.S. Pat. Nos. 4,916,198 and 5,047,445, the methods of which are incorporated herein by reference. The peroxide treatment is generally carried out according to the method described in U.S. Pat. No. 5,047,485, the methods of which are incorporated herein by reference.

The propylene polymer material used in the composition of the present invention can be blended with component (A) in a neat form, or in the form of a "concentrate", wherein the propylene polymer material is first dispersed in a propylene polymer resin that is the same as or different from component (A) before blending with component (A).

In addition to the propylene polymer resin and propylene polymer material, the composition may also contain conventional additives, such as pigments, antioxidants, UV stabilizers and antacids.

The composition of the present invention can be prepared according to conventional methods, for example, mixing the propylene polymer resin, the propylene polymer material, or a concentrate thereof, and well known additives, such as a Henschel or Banbury mixer, to uniformly disperse the ingredients, at a temperature equal to or exceeding the polymer softening temperature, then extruding the mixture and pelletizing.

The propylene polymer resin can be "visbroken" to have a melt flow rate (MFR, according to ASTM D-1238, measured at 230°, 2.16 kg) of from about 5 to 50, preferably from about 10 to 50, more preferably from about 25 to 45, having an original MFR of from about 0.4 to 10. Alternatively, the propylene polymer resin can be produced directly in the polymerization reactor to the preferred MFR. If desired, visbreaking can be carried out in the presence or absence of crystalline polypropylene.

The process of visbreaking a propylene polymer resin is well known to those ordinarily skilled in the art. Generally, it is carried out as follows: polypropylene in "as polymerized" form, e.g., powder or flake from the reaction withouth any further processing, has sprayed thereon or blended therewith, a prodegradant or free radical generating source, e.g. a peroxide in liquid or powder form or a polymer/peroxide concentrate, (Xantrix 3024 polypropylene/peroxide concentrate available from HIMONT U.S.A., Inc.). The propylene polymer/peroxide mixture is then introduced into a means for thermally plasticizing and conveying the mixture. Residence time and temperature are controlled in relation to the particular peroxide selected (i.e., based on the half-life of the peroxide at the process temperature of the extruder) so as to effect the desired degree of polymer chain degradation. The net result is to narrow the molecular weight distribution of the propylene polymer modified, as well as to reduce the overall molecular weight and thereby increase the MFR relative to the as-polymerized polymer. For example, a polymer with a fractional MFR (i.e. less than 1), or a polymer with a MFR of 0.4–10, can be selectively visbroken to a MFR of 5–50, preferably 25–45, e.g., about 35, by selection of the peroxide type, extruder temperature and extruder residence time all of which is well known to those of ordinary skill in the art of visbreaking polymer with peroxides.

In general, the prodegradant should not interfere with or be adversely affected by commonly used polypropylene stabilizers and should effectively produce free radicals that upon decomposition initiate degradation of the polypropylene moiety. The prodegradant should have a short enough half-life at a polymer manufacturing extrusion temperature, however, so as to be completely or substantially completely reacted before exiting the extruder. Preferably, they have a half-life in the polypropylene of less than 9 seconds at 550° F. so that at least 99% of the prodegradant reacts in the molten polymer before 1 minute of extruder residence time. Such prodegradants include, by way of example and not limitation, the following: 2,5-dimethyl-2,5-bis(t-butylperoxy)hexyne-3 and 4-methyl-4-t-butyl-peroxy-2-pentanone (e.g. Lupersol 130 and Lupersol 120 peroxides available from Lucidol Division, Penwalt Corporation); 3,6,6,9,9-pentamethyl-3--ethyl acetate-1,2,4,5-tetraoxycyclononane (e.g. USO-138 products from Witco Chemical Corporation); 2,5-dimethyl-2,5-bis-(t-butyl-peroxy)hexane (e.g. Lupersol 101 peroxide); and alpha, alpha'-bis-(tert-butylperoxy)diisopropylbenzene (e.g., Vulcup R peroxide from Hercules Inc.). Preferred concentration of the free radical source prodegradants are in the range of from about 0.01 to 0.4%, based on the weight of the polymer(s). Particularly preferred is Lupersol 101 peroxide, wherein the peroxide is sprayed onto or mixed with the propylene polymer at a concentration of about 0.1 weight % prior to their being fed to an extruder at about 230° C., for a residence time of about 2 to 3 minutes. Extrusion processes relating to the treatment of propylene-containing polymer in the presence of an organic peroxide to increase melt flow rate and reduce viscosity are known in the art and are described, e.g. in U.S. Pat. Nos. 3,862,265, 4,451,589 and 4,578,430.

Various articles can be prepared from the fibers, filaments, or yarns produced from the compositions of the present invention, such as fabrics or non-woven webs, by spinning processes, as well as by spun-bonded or melt-blown processes.

The present invention will be illustrated in greater detail with reference to the examples of the invention set forth below.

All yarns used in the examples below are 300 denier, 4.2 denier per filament.

The ingredients used in the preparation of the compositions of this invention illustrated in the examples that follow are:

Polymer A—a propylene homopolymer having a MFR of 34 dg/min., prepared by visbreaking with Lupersol 101 peroxide a propylene homopolymer having an initial MFR of 1.5 dg/min.

Polymer B—a propylene homopolymer having a MFR of 34 dg/min., prepared by visbreaking with Lupersol 101 peroxide a propylene homopolymer having an initial MFR of 0.4 dg/min.

Polymer C—a propylene homopolymer having an as-polymerized MFR of 30 dg/min.

Polymer D—a high melt strength propylene homopolymer having a MFR of 4.6 dg/min., and branching index of 0.6±0.2.

Stabilizer 1—Irgafos 168 tris(2,4-di-tert-butylphenyl) phosphite stabilizer.

Stabilizer 2—Tinuvin 622DL dimethyl succinate polymer with 4-hydroxy-2,2,6,6-tetramethyl-1-piperidine ethanol stabilizer.

Stabilizer 3—Chimassorb 944FL N,N'-bis(2,2,6,6-tetramethyl-4-piperidinyl)-1,6-hexanediamine polymer with 2,4,6-trichloro-1,3,5-trazine and 2,4,4-trimethyl-1,2-pentanamine stabilizer.

EXAMPLES 1 and 2

A propylene polymer composition of the present invention is prepared by mixing a propylene polymer resin, a high melt strength propylene polymer material, the stabilizers, calcium stearate and pigment concentrate, until the ingredients are uniformly dispersed, at a temperature equal or exceeding the polymers' softening temperature, then the mixture is extruded and pelletized. The pigment concentrate is (a) a concentrate of 50% $TiO_2$ in a dispersion medium of which is approximately 45–48% of a propylene homopolymer having a 12 MFR (herein referred to as "white") predispersed in polymer B at letdown ratio of 10:1, said concentrate is incorporated into the propylene polymer composition at a letdown ratio of 12:1 (propylene polymer composition to pigment concentrate) to obtain a level of 0.35 wt % $TiO_2$, based on the total propylene polymer composition or (b) a concentrate of 27% navy blue in a dispersion medium of which approximately 70% is a propylene homopolymer having a 12 MFR (herein referred to as "blue") predispersed in polymer B at letdown ratio of 3.5:1, said concentrate is incorporated into the propylene polymer composition at a letdown ratio of 8.5:1, to obtain a level of 0.71 wt % navy blue, based on the total propylene polymer composition.

Yarns were prepared from fibers of the compositions of each example illustrated in Table 1, which were prepared according to the method described above.

The draw ratio, spinning speed and physical properties are set forth in Table 1.

Controls 1 and 2

Yarns were prepared from fibers of the compositions of each example illustrated in Table 1, except that the compositions did not contain high melt strength propylene polymer material.

The draw ratio, spinning speed, and physical properties are set forth in Table 1.

TABLE 1

| Ingredients | Ex. 1 | C-1 | Ex. 2 | C-2 |
| --- | --- | --- | --- | --- |
| Polymer A, % | 91.92 | — | 89.31 | — |
| Polymer B, % | 6.98 | 99.04 | 7.68 | 97.13 |
| Polymer D, % | 0.14 | — | 0.14 | — |
| Stabilizer 2, % | 0.09 | 0.09 | 0.09 | 0.09 |
| Stabilizer 3, % | 0.04 | 0.04 | 0.04 | 0.04 |
| Stabilizer 1, % | 0.10 | 0.10 | 0.10 | 0.10 |
| Calcium Stearate | 0.03 | 0.03 | 0.03 | 0.03 |
| Pigment | | | | |
| white, % | 0.35 | 0.35 | — | — |
| blue, % | — | — | 0.71 | 0.71 |
| Dispersion Medium | 0.35 | 0.35 | 1.90 | 1.90 |
| Draw Ratio | 3.4x | 2.6x | 3.4x | 3.4x |
| Spinning Speed, m./min. | 735 | 962 | 735 | 735 |
| Spin/Draw Speed, m./min. | 2500 | 2500 | 2500 | 2500 |

TABLE 1-continued

| Ingredients | Ex. 1 | C-1 | Ex. 2 | C-2 |
| --- | --- | --- | --- | --- |
| Properties | | | | |
| Elongation @ Break, % | 51 | 49 | 52 | 41 |
| Spinning Performance | Good | Good | Good | Good |

It can be seen from the data in Table 1, that comparable or better elongation can be obtained at a higher draw ratio and lower spinning speed with white colored yarns of fibers prepared from the composition of Example 1 of the present invention, as compared to the elongation of the white yarns of Control 1 drawn and spun at processing conditions typically used for white colored yarns of polypropylene, lower draw ratio and higher spinning speed. In Example 2 of the present invention improved elongation is achieved in blue colored yarns as compared to the blue colored yarns of Control 2 under the same processing conditions.

EXAMPLES 3–5

A concentrate of 100 parts of polymer C, 11.10 parts of polymer D, 0.03 parts calcium stearate, 0.10 parts Stabilizer 1, 0.85 parts Stabilizer 2 and 0.85 parts Stabilizer 3 is prepared according to the procedure described above.

Polymer B is blended with said concentrate, varying the ratio of polymer B:concentrate. The same white pigment concentrate used in Example 1 is added at 12:1 letdown ratio.

Yarns were prepared from the fibers of the blend prepared above containing polymer B, the concentrate and a white color concentrate is added to the compositions at a letdown ratio of propylene polymer composition to pigment concentrate of 12:1. The draw ratio, spinning speed and physical properties are set forth in Table 2.

Controls 3 and 4

Yarns were prepared from fibers of the compositions of Examples 3–5, and same spin/draw speed, except that the amount of polymer D in the total composition was 0.3% and 0.5%, which is outside the scope of this invention. The draw ratio, spinning speed and physical properties are set forth in Table 2.

TABLE 2

| Ingredients | Ex. 3 | Ex. 4 | Ex. 5 | C-1 | C-3 | C-4 |
| --- | --- | --- | --- | --- | --- | --- |
| Polymer B: Concentrate | 99:1 | 99:1 | 50:1 | 100:0 | 33:1 | 20:1 |
| Polymer D, % | 0.1 | 0.1 | 0.2 | 0 | 0.3 | 0.5 |
| Draw Ratio | 3.0x | 3.4x | 3.4x | 2.6x | 3.4x | 3.0x |
| Spinning Speed, m./min | 833 | 735 | 735 | 962 | 735 | 833 |
| Properties | | | | | | |
| Elongation @ Break | 64 | 54 | 58 | 49 | — | — |
| Spinning Preformance | Good | Good | Good | Good | Brks | Brks |

As demonstrated in Table 2, the white yarns prepared from the compositions of the present invention Examples 3–5 have improved elongation and can be spun at a reduced spinning speed and increased draw ratio as compared to the white yarns of Control 1, which did not contain polymer D and Controls 3 and 4 which contained amounts of polymer D outside the scope of this invention.

EXAMPLES 6-9

A concentrate of 100 parts of polymer C, 1.56 parts of polymer D, 0.03 parts calcium stearate, 0.10 parts Stabilizer 1, 0.78 parts Stabilizer 2 and 0.78 parts Stabilizer 3 is prepared according to the procedure described above.

Polymer B is blended with said concentrate, varying the ratio of polymer B:concentrate. The same white pigment concentrate used in Example 1 is added to the compositions at a letdown ratio of propylene polymer composition to pigment concentrate of 12:1.

Yarns are prepared from fibers of the composition described above of the present invention at a spin/draw speed of 2500 m/min. The draw ratio, spinning speed and properties are set forth in Table 3.

TABLE 3

| Ingredients | Ex. 6 | Ex. 7 | Ex. 8 | Ex. 9 | C-1 |
| --- | --- | --- | --- | --- | --- |
| Polymer B: Concentrate | 25:1 | 20:1 | 15:1 | 12:1 | 100:0 |
| Polymer D, % | 0.065 | 0.076 | 0.101 | 0.126 | 0 |
| Draw Ratio | 3.4x | 3.4x | 3.4x | 3.4x | 2.5x |
| Spinning Speed, m./min | 735 | 735 | 735 | 735 | 1000 |
| Properties Elongation @ Break | 49 | 48 | 52 | 50 | 48 |

It can be seen in Table 3, that the white yarns prepared from the compositions of the present invention Examples 6-9 have similar or improved elongation and can be spun at a reduced spinning speed and increased draw ratio as compared to the white yarns of Control 1, which did not contain polymer D.

EXAMPLES 10-14

Yarns were prepared from fibers of the composition of the present invention consisting of a blend of polymer B and the concentrate used in the examples of Table 3, except that blue pigment concentrate of example 2 is used at a 8.5:1 letdown ratio instead of white.

A draw ratio of 3.4× and a spinning speed of 735 m./min. was used for all of the yarns in the examples and control. The physical properties are set forth in Table 4.

TABLE 4

| Ingredients | Ex. 10 | Ex. 11 | Ex. 12 | Ex. 13 | Ex. 14 | C-1 |
| --- | --- | --- | --- | --- | --- | --- |
| Polymer B: Concentrate | 30:1 | 25:1 | 20:1 | 15:1 | 12:1 | 100:0 |
| Polymer D, % | 0.05 | 0.065 | 0.076 | 0.101 | 0.126 | 0 |
| Elongation @ Break | 48 | 47 | 47 | 47 | 48 | 41 |

It can be seen from the results in Table 4 that the blue yarns prepared by the compositions of Examples 10-14 of the present invention have the same or improved elongation as compared to the blue yarn of Control 1 spun at the same spinning conditions.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

I claim:

1. A propylene polymer composition consisting essentially of (A) a propylene polymer resin having a melt flow rate of from about 5 to 50 dg/min selected from the group consisting of (i) a propylene homopolymer having an isotactic index greater than 80, and (ii) a random copolymer of propylene and olefin selected from ethylene and $C_{4-10}$ alpha-olefins and (B) from 0.05 to 0.2% of a normally solid, high molecular weight, gel-free, propylene polymer material having a branching index of from 0.2 to 0.9 and significant strain hardening elongational viscosity, and obtained from an irradiated or peroxide treated normally solid, high molecular weight, linear propylene polymer resin.

2. The composition of claim 1, wherein said propylene polymer material is selected from the group consisting of (i) a homopolymer of propylene, (ii) a random copolymer of propylene and an olefin selected from the group consisting of ethylene and $C_{4-10}$ alpha-olefins, and (iii) a random terpolymer of propylene and alpha-olefins selected from the group consisting of ethylene and $C_{4-8}$ alpha-olefins.

3. The composition of claim 2, wherein said propylene polymer material is a propylene homopolymer.

4. The composition of claim 1, wherein said propylene polymer material is present in an amount of from 0.05 to 0.126%.

5. The composition of claim 1, wherein said propylene polymer material is predispersed in a propylene polymer resin selected from the group consisting of (i) a propylene homopolymer having an isotactic index greater than 80, or (ii) a random copolymer of propylene and an olefin selected from ethylene or $C_{4-10}$ alpha-olefins.

6. The composition of claim 5, wherein said propylene polymer resin is a propylene homopolymer.

7. A fiber prepared from the composition of claim 1.
8. A fiber prepared from the composition of claim 5.
9. A yarn prepared from the composition of claim 1.
10. A yarn prepared from the composition of claim 5.
11. A web prepared from the fiber of claim 7.
12. A web prepared from the fiber of claim 8.
13. A web prepared from the yarn of claim 9.
14. A web prepared from the yarn of claim 10.
15. A fabric prepared from the web of claim 11.
16. A fabric prepared from the web of claim 12.
17. A fabric prepared from the web of claim 13.
18. A fabric prepared from the web of claim 14.

* * * * *